(12) United States Patent
Ezer

(10) Patent No.: US 11,376,986 B2
(45) Date of Patent: Jul. 5, 2022

(54) METHOD AND SYSTEM FOR VALIDATING POWER METERING OF POWER OVER THE AIR SYSTEM FOR VEHICLES

(71) Applicant: Electric Road Ltd., Rosh Haayin (IL)

(72) Inventor: Oren Ezer, Tel Aviv (IL)

(73) Assignee: Electric Road Ltd., Beit Yanai (IL)

( * ) Notice: Subject to any disclaimer, the term of this patent is extended or adjusted under 35 U.S.C. 154(b) by 0 days.

(21) Appl. No.: 17/352,304

(22) Filed: Jun. 20, 2021

(65) Prior Publication Data

US 2021/0309119 A1 Oct. 7, 2021

Related U.S. Application Data

(63) Continuation of application No. PCT/IL2019/051391, filed on Dec. 19, 2019.

(30) Foreign Application Priority Data

Dec. 20, 2018 (GB) ..................................... 1820880

(51) Int. Cl.
*B60L 53/66* (2019.01)
*B60L 53/12* (2019.01)
(Continued)

(52) U.S. Cl.
CPC ............. *B60L 53/665* (2019.02); *B60L 53/12* (2019.02); *B60L 53/62* (2019.02); *B60L 53/65* (2019.02); *B60L 53/68* (2019.02); *B60L 2270/32* (2013.01)

(58) Field of Classification Search
CPC .... B60L 53/66; B60L 53/665; B60L 2270/30; B60L 2270/32
See application file for complete search history.

(56) References Cited

U.S. PATENT DOCUMENTS 8,030,888 B2 10/2011 Pandya et al.
8,884,581 B2 11/2014 Widmer et al.
(Continued)

FOREIGN PATENT DOCUMENTS

CN 104539008 4/2015
GB 2521676 7/2015
(Continued)

OTHER PUBLICATIONS

International Search Report and Written Opinion for PCT Application No. PCT/IL2019/051391, dated Apr. 23, 2020.
(Continued)

*Primary Examiner* — David V Henze-Gongola
(74) *Attorney, Agent, or Firm* — Pearl Cohen Zedek Latzer Baratz LLP

(57) ABSTRACT

A system and a method for validating electric vehicles in a network are provided herein. The method may include the following steps: transmitting energy from at least one road section to at least one electric vehicle; recording a magnitude of energy received by said at least one electric vehicle and transmitting a record of said magnitude of energy received for validation; recording a magnitude of energy transmitted from said at least one road section and transmitting a record of said magnitude of energy transmitted for validation; and validating energy usage of said at least one electric vehicle by periodically comparing said magnitude of energy received with said magnitude of energy transmitted to identify at least one of: component failure; and, a potential fraud. The system implements the method in a power-over-the-air network for electric vehicles.

13 Claims, 4 Drawing Sheets

(51) Int. Cl.
    *B60L 53/68*     (2019.01)
    *B60L 53/62*     (2019.01)
    *B60L 53/65*     (2019.01)

(56) References Cited

U.S. PATENT DOCUMENTS

2011/0254505 A1*   10/2011   Evander .................. B60L 53/65
                                                                       320/109
2015/0324798 A1*   11/2015   Kai ........................ B60L 53/65
                                                                       705/40

FOREIGN PATENT DOCUMENTS

| JP | 2014079077 | 5/2014 |
| WO | WO 2015/101986 | 7/2015 |
| WO | WO 2018/002931 | 1/2018 |

OTHER PUBLICATIONS

Office Action for GB Patent Application No. 1820880.1, dated Jun. 18, 2019.

* cited by examiner

METHOD AND SYSTEM FOR VALIDATING POWER METERING OF POWER OVER THE AIR SYSTEM FOR VEHICLES

CROSS-REFERENCE TO RELATED APPLICATIONS

This application is a continuation of PCT Application No. PCT/IL2019/051391, filed on Dec. 19, 2019, which claims priority from GB Patent Application No. GB1820880.1 filed on Dec. 20, 2018, both are incorporated herein by reference in their entireties.

FIELD OF THE INVENTION

The present invention relates generally to validation, metering and billing systems, and more particularly to such systems detecting potential component failure and/or fraud in electric vehicles.

BACKGROUND OF THE INVENTION

Prior to setting forth a detailed description of the invention, the following term definitions are provided:

The term 'electric vehicle' refers generally to a vehicle powered solely, or in part, by electrical energy stored (e.g., chemically) in a battery, or the like. In the present context, an 'electric vehicle' moreover has provision for receiving (e.g., at coils disposed on the underside of the vehicle) a wirelessly induced electromotive force (i.e., voltage) that may be stored, or otherwise utilized to recharge the battery. For an electromagnetically induced voltage to occur, the vehicle (i.e., the 'conductor') may be moving relative to a magnetic field which is, for example, projected about the road upon which the vehicle is travelling. Alternatively, the magnetic field may be periodically varied (e.g., through use of alternating current) thereby inducing a voltage at the vehicle.

The term 'road section' refers generally to a portion of, for example, a highway or motorway which has been modified to comprise a medium for wirelessly transmitting power (i.e., a 'power transmitter'). This may mean that the road comprises a plurality of coils embedded beneath the surface of the road section which are operable to emit a magnetic field. In typical arrangements, the medium (coils) may be connected to an alternating current source and may generate a varying magnetic field, thereby inducing a voltage in any proximate conductor. One possible approach to powering on-road electric vehicles via wireless power transfer is disclosed in US Parent Application Publication Number US 2016/0339785 A1 and is incorporated herein by reference.

Due to the often-prohibitive expense involved in wirelessly transmitting power to electric vehicles, there is a requirement to accurately produce bills associated with each individual user's usage. Typical approaches have entailed periodically (e.g., once per month) assessing an amount of power received by each vehicle and producing a bill corresponding to this amount. Such methods of metering and billing are however flawed and unduly susceptible to improper conduct by drivers and third parties. In particular, as there is no redundancy or secondary information source, it is possible for power reception values to be infiltrated and desirably modified (e.g., to a lower value to achieve a smaller bill) without being noticed. There may also be instances where particular components have failed, for example due to age or overuse, and have thereby (favorably or unfavorably) produced inaccurate readings. Accordingly, it is an object of the invention to propose a means for detecting component failure in wireless power transmission arrangements. It is a further object if the invention to propose a means for tracking potential fraud in wireless power transmission arrangements.

SUMMARY OF THE PRESENT INVENTION

The present invention provides a validation network for electric vehicles, comprising: at least one electric vehicle having at least one energy receiver and a vehicle communication unit; at least one road section having at least one energy transmitter and a management communication unit; and, a validation control center having at least one validation control unit and a validation communication unit; wherein said at least one electric vehicle is operable to receive energy, at said at least one energy receiver, from said at least one energy transmitter; wherein a record of a magnitude of energy received at said at least one energy receiver is transmitted from said vehicle communication unit to said validation communication unit; wherein a record of a magnitude of energy transmitted from said at least one energy transmitter is transmitted from said management communication unit to said validation communication unit; and wherein said validation unit is operable to periodically compare said magnitude of energy received with said magnitude of energy transmitted to identify at least one of: component failure; and, a potential fraud.

The present invention further provides a method for validating electric vehicles in a network, comprising: transmitting energy from at least one road section to at least one electric vehicle; recording a magnitude of energy received by said at least one electric vehicle and transmitting a record of said magnitude of energy received for validation; recording a magnitude of energy transmitted from said at least one road section and transmitting a record of said magnitude of energy transmitted for validation; and, validating energy usage of said at least one electric vehicle by periodically comparing said magnitude of energy received with said magnitude of energy transmitted to identify at least one of: component failure; and, a potential fraud.

These and other advantages of the present invention are set forth in detail in the following description.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

DETAILED DESCRIPTION OF THE INVENTION

Figure 1:
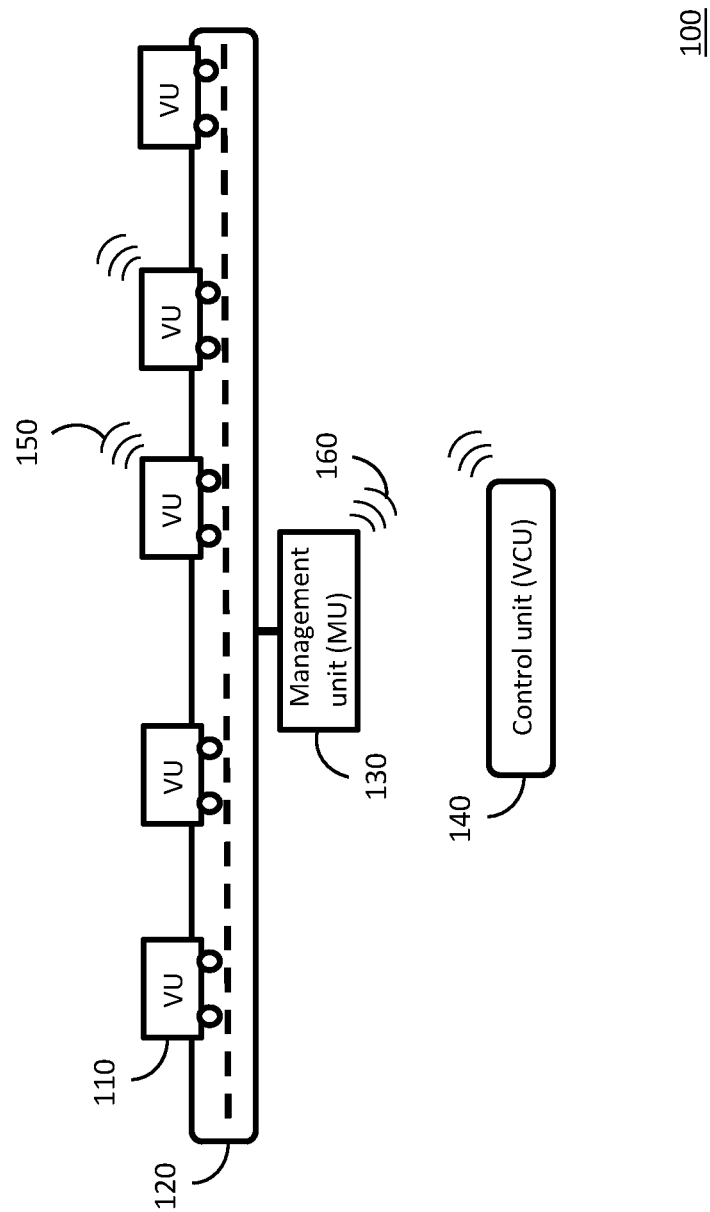
FIG. 1 is a block diagram illustrating non-limiting exemplary architecture of a validation network for electric vehicles in accordance with embodiments of the present invention.

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 is a block diagram illustrating non-limiting exemplary architecture of a validation network for electric vehicles 100 according to embodiments of the invention. Validation network 100 may include a plurality of electric vehicles each comprising a vehicle unit 110, a vehicle communications unit, and a power receiver attached, for example, to an underside of the vehicle. The plurality of electric vehicles may further travel upon a road section 120 having one or more power transmitters disposed, for example, underneath the surface of the road section. In some embodiments, each power receiver and power transmitter may comprise one or more wound or looped coils coupled, for example, to an alternating current source. In some arrangements, these coils may be operable to emit a static or varying magnetic field into a vicinity about the coils, for example around the road section or portions thereof. As each electric vehicle travels along road section 120, a magnetic field formed by power transmitters in road section 120 induces a voltage in each power receiver and is stored and/or converted by the electric vehicle into, for example, chemical energy in a battery. In alternative embodiments, the induced energy may be immediately used by an engine of the electric vehicle without storage.

In some embodiments, vehicle unit 110 may be operable to calculate a total amount (i.e., magnitude) of energy received by its respective electric vehicle by multiplying a known rate of transfer (i.e., power, or joules per second) by the recorded duration of the transfer. In alternative embodiments, vehicle unit 110 may be operable to directly record a magnitude of energy received by its respective vehicle, for example by monitoring battery power gains during a recharge cycle and/or by utilizing, for example, a current probe to determine a precise amount of induced voltage. In some embodiments, the rate of current sampling may be in the range of KHz to MHz, as appropriate.

In some embodiments, vehicle unit 110 may comprise a vehicle memory unit containing one or more flash memory units and one or more Static Random-Access Memory (SRAM) units. A value equaling the total magnitude of energy used by the electric vehicle (i.e., the energy used over all journeys) may be retained and updated by the vehicle unit 110 on the one or more flash memory units. A value equaling the magnitude of energy used in a predefined recording period (e.g., minutes, hours, days, months, or the like) may also be retained and updated by the vehicle unit 110 on the one or more SRAM units. In some embodiments, the value equaling the total magnitude of energy used by the electric vehicle may only be updated/altered by additions, said additions equaling the value for the magnitude of energy used in the predefined recording period. In some embodiments, the value equaling the magnitude of energy used in the predefined recording period is reset to a base/zero value at the end of each recording period.

In some embodiments, road section 120 may further comprise at least one management unit 130 and at least one management communications unit. Additionally, validation network 100 may further comprise a validation control center comprising at least one validation control unit 140 and at least one validation communications unit. In some embodiments, each of said vehicle units 110 may be operable to transmit a message 150 using said vehicle communications unit, to said validation control center via any appropriate transmission means, such as WiFi, Bluetooth, or the like. Transmitted messages 150 may comprise data/information including the values equaling: the magnitude of energy received in the predefined period; and/or, the total magnitude of energy received by the electric vehicle up to that point.

In some embodiments, management unit 130 may be operable to record/calculate a value equaling the total amount (i.e., magnitude) of energy transmitted to specific vehicles from the road section 120 by multiplying a known rate of transfer (i.e., power, or joules per second) by the recorded duration of the transfer. In alternative embodiments, management unit 130 may be operable to directly record a magnitude of energy transmitted to respective vehicles, for example by using a current probe to record the current passed through the coils and/or by determining the strength of the magnetic field emanating from the coils and/or by calculating the total amount of energy transferred to the road section 120 and deriving therefrom a value of energy transmitted to specific vehicles. In some embodiments, the rate of current and/or magnetic field sampling may be in the range of KHz to MHz, as appropriate.

In some embodiments, management unit 130 may be operable to transmit a message 160 using said management communications unit, to said validation control center via any appropriate transmission means, such as WiFi, Bluetooth, or the like. Transmitted messages 160 may comprise data/information including the values equaling: the magnitude of energy transmitted to specific vehicles in the predefined period; and/or, the total magnitude of energy transmitted by the road section 120 up to that point. Messages transmitted 150, 160 from the or each vehicle unit 110 and the or each management unit 130 may take the following form:

| VU ("0") or MU ("1") | Unique ID Number | Total Energy (KW/Hr) | Additional Energy (KW/Hr) |
|---|---|---|---|
| 4 bits ("0") | 48 bits | 48 bits | 20 its |

Figure 2:
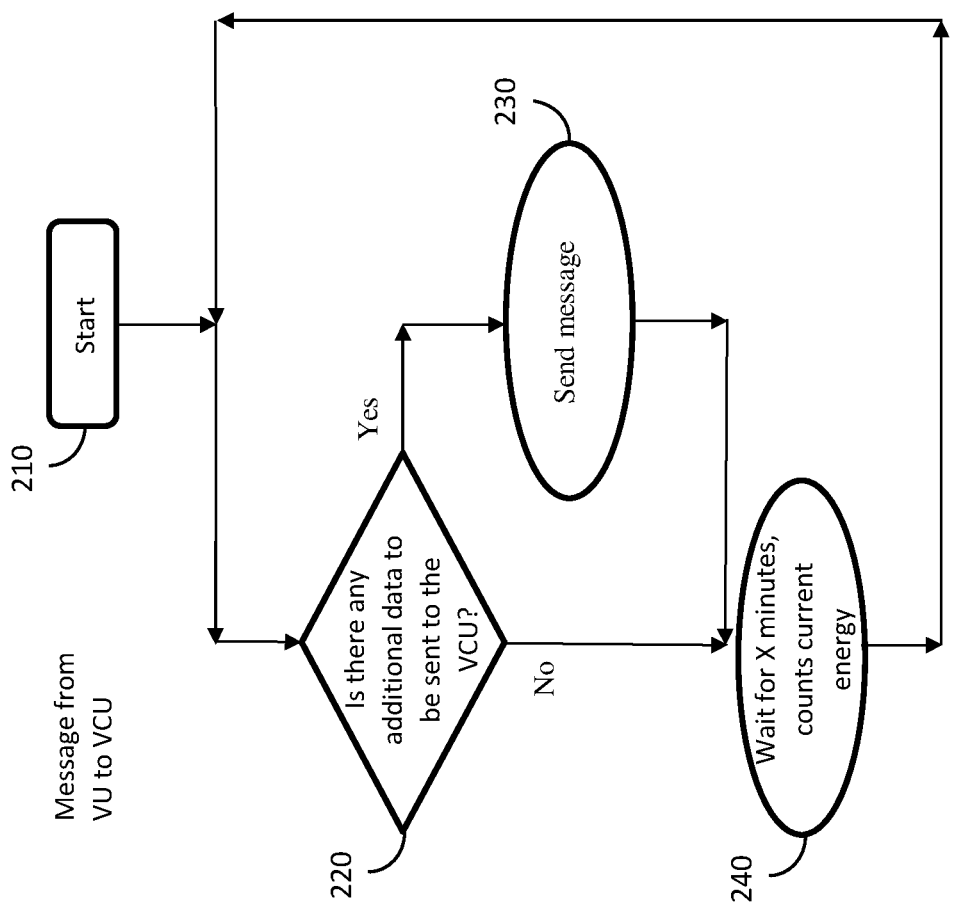
FIG. 2 is flowchart illustrating an exemplary validation process in accordance with embodiments of the present invention.

FIG. 2 is flowchart illustrating an exemplary validation process 200 according to embodiments of the invention. Before messages are transmitted 150 from the or each vehicle unit 110, it is important to first establish whether the electric vehicle (i.e., associated with that vehicle unit 110) has received energy within that period. This has the benefit of obviating needless data transmission and/or saving power. Vehicle unit 110 may therefore periodically start 210 a validation process 200 and thereby determine whether there is any additional and/or new usage data 220 which needs to be sent to the validation control unit 140. This may be done by assessing whether there are any data and/or usage values stored on the one or more of the SRAM units (i.e., whether the magnitude of energy used in the predefined recording period is non-zero). In the event that there are new and/or additional values to be sent, a message 230 may be transmitted 150 from the vehicle unit 110 to the validation control unit 140 containing said new and/or additional values. Thereafter the validation process 200 may proceed to wait 240 for a predefined amount of time (e.g., minutes, hours, or the like) before once again running the validation process from the start 210. Alternatively, in the event that there are not new and/or additional values to be sent, the validation process 200 may proceed directly to waiting 240 for said predefined amount of time before restarting the validation process from the start 210.

In some embodiments, should the electric vehicle trigger a shutdown, additional usage data/values (i.e., the magnitude of energy received in that predefined recording period) stored on the one or more SRAM units may be immediately added (i.e., prior to full shutdown) to total usage data/values (i.e., the total magnitude of energy received by the electric vehicle up to that point) stored on the one or more flash memory units. Alternatively, the additional usage data/values may be transferred to the one or more flash memory units without being added to total usage data/values. When the electric vehicle once again powers on, these values may be retrieved from the one or more flash memory units and sent back to the one or more SRAM. The vehicle unit may then resume counting usage data/values for that period utilizing said one or more SRAM units.

Figure 3:
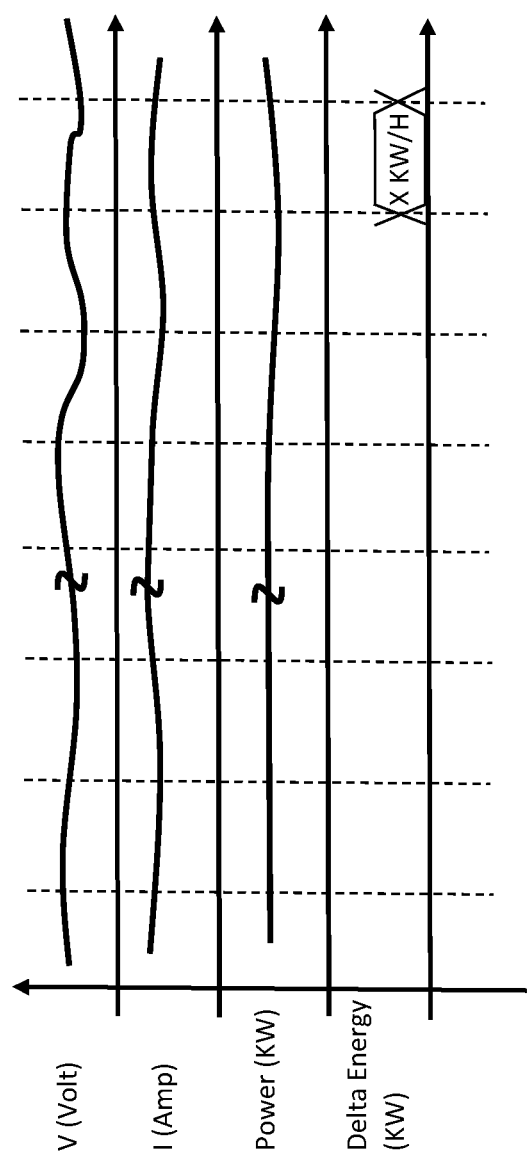
FIG. 3 is a graph illustrating an exemplary sampling process in accordance with embodiments of the present invention; and, FIG. 4 is a high-level flowchart illustrating a non-limiting exemplary method in accordance with embodiments of the present invention.

FIG. 3 is a graph illustrating an exemplary sampling process 300 according to embodiments of the invention. After a message is transmitted 150 from the or each vehicle unit 110, validation control unit 140 may be operable to compare the value of the total magnitude of energy received by the electric vehicle to pre-existing and/or known values for the total magnitude of energy transmitted and/or the total magnitude of energy received. In some embodiments, these pre-existing and/or known values may be obtained from the or each management unit 130 via transmission 160. In alternative embodiments, these pre-existing and/or known values may be retained from previous transmissions 150 between the vehicle unit 110 and validation control unit 140. In the event that the values are identical, the validation control unit 140 may instruct the vehicle unit 110 to add the value for the magnitude of energy received in that predefined recording period to the value for the total magnitude of energy received by the electric vehicle up to that point. The vehicle unit 110 may then also be instructed to reset the value for the magnitude of energy received in that predefined recording period to a base/zero value and start a new recording period. In the event that the values are not identical, the validation control unit 140 may transmit corrected data/values to the vehicle unit 110 and the instruct the vehicle unit 110 to update the incorrect data/value with the correct one. The validation control unit 140 may also flag/indicate a potential for fraud and/or component failure. This may comprise a warning and/or alert and may be presented to one or more of: a user of the electric vehicle; and, a system administrator.

Figure 4:
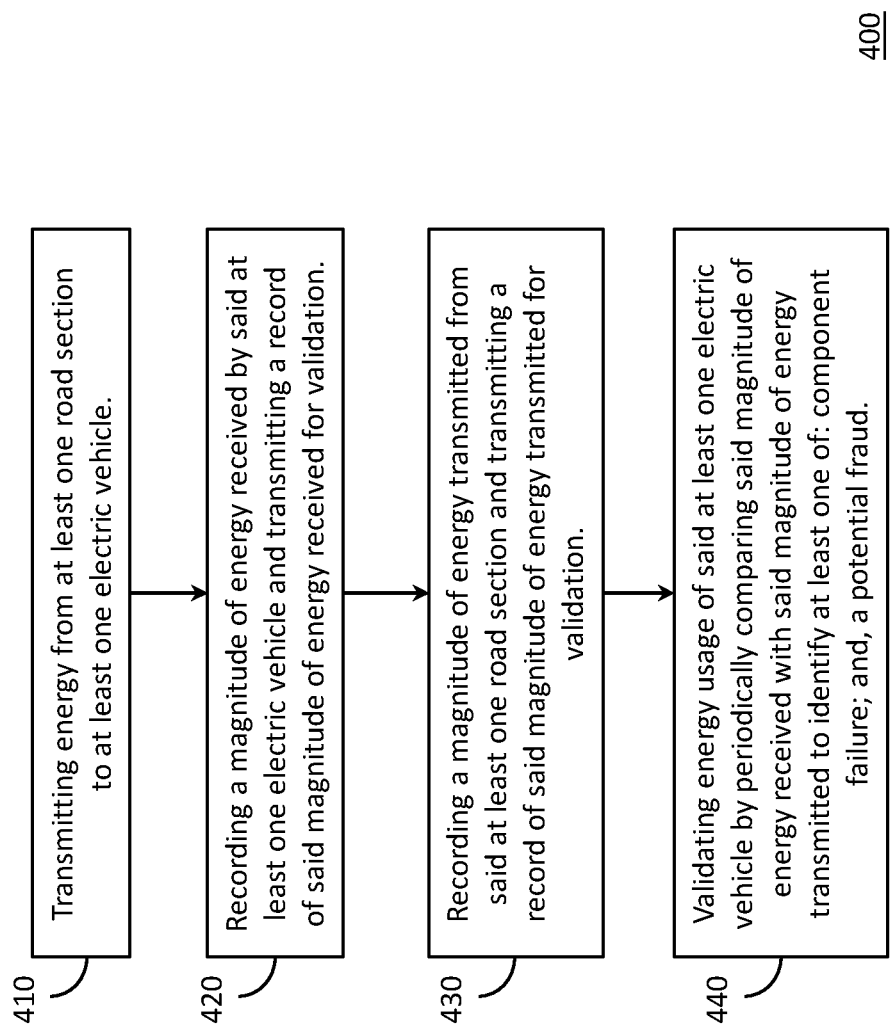

FIG. 4 is a high-level flowchart illustrating a non-limiting exemplary method according to embodiments of the invention. The method 400 may comprise the steps of: transmitting energy from at least one road section to at least one electric vehicle 410; recording a magnitude of energy received by said at least one electric vehicle and transmitting a record of said magnitude of energy received for validation 420; recording a magnitude of energy transmitted from said at least one road section and transmitting a record of said magnitude of energy transmitted for validation 430; and, validating energy usage of said at least one electric vehicle by periodically comparing said magnitude of energy received with said magnitude of energy transmitted to identify at least one of: component failure, and, a potential fraud 440.

In some embodiments, said at least one electric vehicle may further comprise a vehicle control unit arranged to: produce said record of said magnitude of energy received at said at least one energy receiver within at least one predefined period; store, in a vehicle memory unit, said record of said magnitude of energy received within said at least one predefined period; retain, in said vehicle memory unit, a record of a total cumulative magnitude of energy received; and, transmit to said validation control center, using said vehicle communication unit at the end of said at least one predefined period, said record of said magnitude of energy received and said record of said total cumulative magnitude of energy received.

In some embodiments, said at least one road section may further comprise a management control unit arranged to: produce said record of said magnitude of energy transmitted to said at least one energy transmitter in said road section within said at least one predefined period; and, transmit to said validation control center, using said management communication unit at the end of said at least one predefined period, said record of said magnitude of energy transmitted.

In some embodiments, said validation control center may be arranged to: receive, using said validation communication unit, records of: said magnitude of energy received; said total cumulative magnitude of energy received; and, said magnitude of energy transmitted; compare said record of said total cumulative magnitude of energy received with a record of a total cumulative magnitude of energy transmitted, wherein said total cumulative magnitude of energy transmitted comprises an addition of all records of said magnitude of energy transmitted from respective predefined periods; and, in the event that said total cumulative magnitude of energy received and said total cumulative magnitude of energy transmitted are not equal, update said vehicle memory unit with a correction by transmitting said record of said total cumulative magnitude of energy transmitted to said at least one electric vehicle using said validation communication unit.

In some embodiments, said validation control center may be arranged to: receive, using said validation communication unit, records of: said magnitude of energy received; and, said total cumulative magnitude of energy received; compare said record of said total cumulative magnitude of energy received with a pre-existing record of a total cumulative magnitude of energy transmitted; and, in the event that said total cumulative magnitude of energy received and said total cumulative magnitude of energy transmitted are not equal, update said vehicle memory unit with a correction by transmitting said pre-existing record of said total cumulative magnitude of energy transmitted to said at least one electric vehicle using said validation communication unit.

In some embodiments, said validation control center may be further arranged, in the event that said total cumulative magnitude of energy received and said total cumulative magnitude of energy transmitted are equal, to: add said record of said magnitude of energy received to said record of said total cumulative magnitude of energy received, to yield an updated record of said total cumulative magnitude of energy received; and, update said vehicle memory unit by transmitting said updated record of said total cumulative magnitude of energy received to said at least one electric vehicle using said validation communication unit.

In some embodiments, each of said at least one electric vehicles may be associated with a use account, wherein each of said user accounts is periodically charged an amount corresponding to energy received by the associated electric vehicle.

In some embodiments, a component failure may comprise a failure of one or more current measuring instruments/probes.

In some embodiments, a potential fraud may comprise an unauthorized manipulation of one or more of: said magnitude of energy received; and, said total cumulative magnitude of energy received.

In some embodiments, said at least one electric vehicle may be arranged to: produce said record of said magnitude of energy received within at least one predefined period; store said record of said magnitude of energy received within said at least one predefined period; retain a record of a total cumulative magnitude of energy received; and, transmit for validation, at the end of said at least one predefined period, said record of said magnitude of energy received and said record of said total cumulative magnitude of energy received.

In some embodiments, said at least one road section may be arranged to: produce said record of said magnitude of energy transmitted within said at least one predefined period; and, transmit for validation, at the end of said at least one predefined period, said record of said magnitude of energy transmitted.

In some embodiments, said validation may comprise: receiving records of: said magnitude of energy received; said total cumulative magnitude of energy received; and, said magnitude of energy transmitted; comparing said record of said total cumulative magnitude of energy received with a record of a total cumulative magnitude of energy transmitted, wherein said total cumulative magnitude of energy transmitted comprises an addition of all records of said magnitude of energy transmitted from respective predefined periods; and, in the event that said total cumulative magnitude of energy received and said total cumulative magnitude of energy transmitted are not equal, updating said at least one electric vehicle with a correction by transmitting said record of said total cumulative magnitude of energy transmitted to said at least one electric vehicle.

In some embodiments, said validation may comprise: receiving records of: said magnitude of energy received; and, said total cumulative magnitude of energy received; comparing said record of said total cumulative magnitude of energy received with a pre-existing record of a total cumulative magnitude of energy transmitted; and, in the event that said total cumulative magnitude of energy received and said total cumulative magnitude of energy transmitted are not equal, updating said at least one electric vehicle with a correction by transmitting said pre-existing record of said total cumulative magnitude of energy transmitted to said at least one electric vehicle.

In some embodiments, said validation, in the event that said total cumulative magnitude of energy received and said total cumulative magnitude of energy transmitted are equal, may further comprise: adding said record of said magnitude of energy received to said record of said total cumulative magnitude of energy received, to yield an updated record of said total cumulative magnitude of energy received; and, updating said at least one electric vehicle by transmitting said updated record of said total cumulative magnitude of energy received to said at least one electric vehicle.

In some embodiments, each of said at least one electric vehicles may be associated with a user account, wherein each of said user accounts is periodically charged an amount corresponding to energy received by the associated electric vehicle.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A validation network for electric vehicles, comprising:
   at least one electric vehicle having at least one energy receiver and a vehicle communication unit;
   at least one road section having at least one energy transmitter and a management communication unit; and
   a validation control center having at least one validation control unit and a validation communication unit,
   wherein said at least one electric vehicle is operable to receive energy, at said at least one energy receiver, from said at least one energy transmitter,
   wherein a record of a magnitude of energy received at said at least one energy receiver is transmitted from said vehicle communication unit to said validation communication unit,
   wherein a record of a magnitude of energy transmitted from said at least one energy transmitter is transmitted from said management communication unit to said validation communication unit,
   wherein said validation control unit is operable to periodically compare said magnitude of energy received with said magnitude of energy transmitted to identify at least one of: component failure; and, a potential fraud, and
   wherein said at least one electric vehicle further comprises a vehicle control unit arranged to:
   i) produce said record of said magnitude of energy received at said at least one energy receiver within at least one predefined period;
   ii) store, in a vehicle memory unit, said record of said magnitude of energy received within said at least one predefined period;
   iii) retain, in said vehicle memory unit, a record of a total cumulative magnitude of energy received; and,
   iv) transmit to said validation control center, using said vehicle communication unit at the end of said at least one predefined period, said record of said magnitude of energy received and said record of said total cumulative magnitude of energy received.

2. The validation network according to claim 1, wherein said at least one road section further comprises a management control unit arranged to:
   i) produce said record of said magnitude of energy transmitted to said at least one energy transmitter in said road section within said at least one predefined period; and,
   ii) transmit to said validation control center, using said management communication unit at the end of said at least one predefined period, said record of said magnitude of energy transmitted.

3. The validation network according to claim 2, wherein said validation control center is arranged to:
   i) receive, using said validation communication unit, records of: said magnitude of energy received; said total cumulative magnitude of energy received; and, said magnitude of energy transmitted;
   ii) compare said record of said total cumulative magnitude of energy received with a record of a total cumulative magnitude of energy transmitted, wherein said total cumulative magnitude of energy transmitted comprises an addition of all records of said magnitude of energy transmitted from respective predefined periods; and,
   iii) in the event that said total cumulative magnitude of energy received and said total cumulative magnitude of energy transmitted are not equal, update said vehicle memory unit with a correction by transmitting said record of said total cumulative magnitude of energy transmitted to said at least one electric vehicle using said validation communication unit.

4. The validation network according to claim 1, wherein said validation control center is arranged to:
   i) receive, using said validation communication unit, records of: said magnitude of energy received; and, said total cumulative magnitude of energy received;
   ii) compare said record of said total cumulative magnitude of energy received with a pre-existing record of a total cumulative magnitude of energy transmitted; and, iii) in the event that said total cumulative magnitude of energy received and said total cumulative magnitude of energy transmitted are not equal, update said vehicle memory unit with a correction by transmitting said pre-existing record of said total cumulative magnitude of energy transmitted to said at least one electric vehicle using said validation communication unit.

5. The validation network according to claim 3, wherein said validation control center is further arranged, in the event that said total cumulative magnitude of energy received and said total cumulative magnitude of energy transmitted are equal, to:
   i) add said record of said magnitude of energy received to said record of said total cumulative magnitude of energy received, to yield an updated record of said total cumulative magnitude of energy received; and,
   ii) update said vehicle memory unit by transmitting said updated record of said total cumulative magnitude of energy received to said at least one electric vehicle using said validation communication unit.

6. The validation network according to claim 1, wherein each of said at least one electric vehicle is associated with a user account, and wherein each of said user accounts is periodically charged an amount corresponding to energy received by the associated electric vehicle.

7. The validation network according to claim 1, wherein said component failure comprises a failure of one or more energy measuring instruments, and wherein said potential fraud comprises an unauthorised manipulation of one or more of: said magnitude of energy received; and, said total cumulative magnitude of energy received.

8. A method for validating electric vehicles in a network, comprising:
   transmitting energy from at least one road section to at least one electric vehicle;
   recording a magnitude of energy received by said at least one electric vehicle and transmitting a record of said magnitude of energy received for validation;
   recording a magnitude of energy transmitted from said at least one road section and transmitting a record of said magnitude of energy transmitted for validation; and
   validating energy usage of said at least one electric vehicle by periodically comparing said magnitude of energy received with said magnitude of energy transmitted to identify at least one of: component failure; and, a potential fraud,
   wherein said at least one electric vehicle is arranged to:
   i) produce said record of said magnitude of energy received within at least one predefined period;
   ii) store said record of said magnitude of energy received within said at least one predefined period;
   iii) retain a record of a total cumulative magnitude of energy received; and
   iv) transmit for validation, at the end of said at least one predefined period, said record of said magnitude of energy received and said record of said total cumulative magnitude of energy received.

9. The method according to claim 8, wherein said at least one road section is arranged to:
   i) produce said record of said magnitude of energy transmitted within said at least one predefined period; and,
   ii) transmit for validation, at the end of said at least one predefined period, said record of said magnitude of energy transmitted.

10. The method according to claim 9, wherein said validation comprises:
   i) receiving records of: said magnitude of energy received; said total cumulative magnitude of energy received; and, said magnitude of energy transmitted;
   ii) comparing said record of said total cumulative magnitude of energy received with a record of a total cumulative magnitude of energy transmitted, wherein said total cumulative magnitude of energy transmitted comprises an addition of all records of said magnitude of energy transmitted from respective predefined periods; and,
   iii) in the event that said total cumulative magnitude of energy received and said total cumulative magnitude of energy transmitted are not equal, updating said at least one electric vehicle with a correction by transmitting said record of said total cumulative magnitude of energy transmitted to said at least one electric vehicle.

11. The method according to claim 8, wherein said validation comprises:
   i) receiving records of: said magnitude of energy received; and, said total cumulative magnitude of energy received;
   ii) comparing said record of said total cumulative magnitude of energy received with a pre-existing record of a total cumulative magnitude of energy transmitted; and,
   iii) in the event that said total cumulative magnitude of energy received and said total cumulative magnitude of energy transmitted are not equal, updating said at least one electric vehicle with a correction by transmitting said pre-existing record of said total cumulative magnitude of energy transmitted to said at least one electric vehicle.

12. The method according to claim 10, wherein said validation, in the event that said total cumulative magnitude of energy received and said total cumulative magnitude of energy transmitted are equal, further comprises:
   i) adding said record of said magnitude of energy received to said record of said total cumulative magnitude of energy received, to yield an updated record of said total cumulative magnitude of energy received; and,
   ii) updating said at least one electric vehicle by transmitting said updated record of said total cumulative magnitude of energy received to said at least one electric vehicle.

13. The method according to claim 8, wherein each of said at least one electric vehicle is associated with a user account, and wherein each of said user accounts is periodically charged an amount corresponding to energy received by the associated electric vehicle.

* * * * *